US011885275B2

(12) United States Patent
Itaba et al.

(10) Patent No.: US 11,885,275 B2
(45) Date of Patent: Jan. 30, 2024

(54) FUEL INJECTION CONTROL DEVICE

(71) Applicant: Hitachi Astemo, Ltd., Hitachinaka (JP)

(72) Inventors: Fumihiro Itaba, Hitachinaka (JP); Osamu Mukaihara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/009,205

(22) PCT Filed: Feb. 9, 2021

(86) PCT No.: PCT/JP2021/004715
§ 371 (c)(1),
(2) Date: Dec. 8, 2022

(87) PCT Pub. No.: WO2021/260998
PCT Pub. Date: Dec. 30, 2021

(65) Prior Publication Data
US 2023/0228227 A1 Jul. 20, 2023

(30) Foreign Application Priority Data
Jun. 23, 2020 (JP) ................ 2020-108259

(51) Int. Cl.
*F02D 41/22* (2006.01)
*F02D 41/30* (2006.01)
*F02M 51/00* (2006.01)
(52) U.S. Cl.
CPC ............ *F02D 41/22* (2013.01); *F02D 41/30* (2013.01); *F02M 51/00* (2013.01)
(58) Field of Classification Search
CPC .......... F02D 41/22; F02D 41/30; F02M 51/00
(Continued)

(56) References Cited

U.S. PATENT DOCUMENTS 8,215,102 B2   7/2012   Yokota
10,309,336 B2   6/2019   Mukaihara et al.
(Continued)

FOREIGN PATENT DOCUMENTS

DE   102009027596 A1 *   1/2010   ......... F02D 41/2438
GB   2 230 393 A         10/1990
(Continued)

OTHER PUBLICATIONS

International Search Report (PCT/ISA/210) issued in PCT Application No. PCT/JP2021/004715 dated May 25, 2021 with English translation (six (6) pages).
(Continued)

*Primary Examiner* — Lindsay M Low
*Assistant Examiner* — Omar Morales
(74) *Attorney, Agent, or Firm* — Crowell & Moring LLP

(57) ABSTRACT

In abnormality determination of determining whether fuel injection has been executed normally, making an erroneous determination is prevented. A fuel injection control device 127 that controls a plurality of fuel injection valves each having a coil for energization includes a drive state detection unit 211 that detects a drive state of a fuel injection valve, from an energization current or an applied voltage of the coil of the fuel injection valve, an injection abnormality detection unit 213 that detects an injection abnormality of the fuel injection valve by comparing a fuel injection instruction with the drive state of the fuel injection valve, and an injection abnormality detection execution determining unit 212 that based on a state of an internal combustion engine, determines whether or not to permit execution of injection abnormality detection by the injection abnormality detection unit 213.

10 Claims, 13 Drawing Sheets

(58) Field of Classification Search
USPC .......................................................... 701/103
See application file for complete search history.

(56) References Cited

U.S. PATENT DOCUMENTS

| | | |
|---|---|---|
| 11,008,988 B2 | 5/2021 | Sugiyama et al. |
| 2010/0011748 A1 | 1/2010 | Yokota |
| 2015/0361918 A1* | 12/2015 | Park .................. F02D 41/28 |
| | | 123/490 |
| 2018/0010545 A1 | 1/2018 | Mukaihara et al. |
| 2020/0056570 A1 | 2/2020 | Sugiyama et al. |

FOREIGN PATENT DOCUMENTS

| | | |
|---|---|---|
| GB | 2 230 393 B | 1/1993 |
| JP | 2-228572 A | 9/1990 |
| JP | 11-190247 A | 7/1999 |
| JP | 2010-24981 A | 2/2010 |
| JP | 2012-127194 A | 7/2012 |
| JP | 2013-36344 A | 2/2013 |
| WO | WO 2016/129402 A1 | 8/2016 |
| WO | WO 2018/155084 A1 | 8/2018 |

OTHER PUBLICATIONS

Japanese-language Written Opinion (PCT/ISA/237) issued in PCT Application No. PCT/JP2021/004715 dated May 25, 2021 (five (5) pages).

* cited by examiner

180# FUEL INJECTION CONTROL DEVICE

TECHNICAL FIELD

The present invention relates to a fuel injection control device.

BACKGROUND ART

Particulate matter, which is one of exhaust gas components that cause air pollution, is widely known. It is a known fact that when a fuel jetted from a fuel injection valve deposits on the crown surface of a piston or on a bore in a combustion chamber and is left unburned, the fuel turns into particulate matter.

Reducing the deposited fuel, therefore, suppresses formation of particulate matter (PN, PM). To reduce the deposited fuel, for example, the spray length (penetration) of the fuel jetted from the fuel injection valve needs to be shortened to prevent the jetted fuel from hitting the crown surface of the piston or the bore, and split injection of performing a plurality of times of injection during one combustion cycle is cited as a method of shortening the spray length.

In fuel injection amount calculation at execution of split injection, a fuel injection amount in a case of performing fuel injection once during one combustion cycle is treated as a total injection amount, and drive control of the fuel injection valve is carried out, using a fuel injection amount in each of multiple split injections, the fuel injection amount being given by dividing the total injection amount by a split ratio based on the number of times of the split injections.

It is required that such split injection include a function of monitoring to see if, in response to a calculated injection request (a fuel injection amount, an injection start timing, the number of times of split injections, and the like), current is normally supplied to the fuel injection valve and fuel injection is executed according to the injection request and determining whether any abnormality is present.

PTL 1 discloses a technique according to which, in split injection of causing a fuel injection valve to inject a fuel multiple times during one combustion cycle, points of change of a drive current flowing through the fuel injection valve and of a drive voltage applied to fuel injection valve are counted, and whether fuel injection is executed according to the number of times of split injections, which is an injection request, is determined.

PTL 2 discloses a technique according to which an abnormality in split injection is detected by detecting a drive current flowing through a fuel injection valve and comparing the drive current with an energization start timing, an energization time, and the like that are calculated through detection of an energization or non-energization state.

CITATION LIST

Patent Literature

PTL 1: WO 2016/129402 A
PTL 2: JP 2013-36344 A

SUMMARY OF INVENTION

Technical Problem

However, the techniques described in PTL 1 and PTL 2 do not take into consideration a state of an internal combustion engine, e.g., a drive state of a fuel injection valve that raises a possibility of erroneously determining split injection to be abnormal despite a fact that the split injection is executed normally. Depending on the state of the internal combustion engine, therefore, the split injection may be determined to be abnormal despite the fact that the split injection is executed normally. This raises a possibility that fail-safe control, such as stopping fuel injection, is unintentionally executed.

The present invention has been conceived in view of the above circumstances, and it is therefore an object of the invention to prevent an erroneous determination in execution of abnormality determination by which whether fuel injection by a fuel injection valve has been executed normally is determined.

Solution to Problem

In order to solve the above problem, a fuel injection control device according to one aspect of the present invention is provided as a fuel injection control device that controls a plurality of fuel injection valves each having a coil for energization. The fuel injection control device includes: a fuel injection pulse output unit that outputs an injection pulse signal for driving a fuel injection valve, based on a fuel injection instruction; a drive state detection unit that detects a drive state of the fuel injection valve, from an energization current or an applied voltage of a coil of the fuel injection valve; an injection abnormality detection unit that detects an injection abnormality of the fuel injection valve by comparing the fuel injection instruction with the drive state of the fuel injection valve; and an injection abnormality detection execution determining unit that based on a state of an internal combustion engine, determines whether or not to permit execution of injection abnormality detection by the injection abnormality detection unit, and that when determining not permitting execution of the injection abnormality detection, prevents the injection abnormality detection unit from executing the injection abnormality detection.

Advantageous Effects of Invention

According to at least one aspect of the present invention, an erroneous determination is prevented in execution of abnormality determination by which whether fuel injection by the fuel injection valve has been executed normally is determined.

Problems, configurations, and effects that are not described above will be made clear by the following description of embodiments.

DESCRIPTION OF EMBODIMENTS

Embodiments of the present invention will hereinafter be described with reference to the accompanying drawings. In this specification and the accompanying drawings, constituent elements that are substantially identical in function or configuration are denoted by the same reference signs, and redundant description is omitted.

<One Embodiment> [Internal Combustion Engine System]

Figure 1:
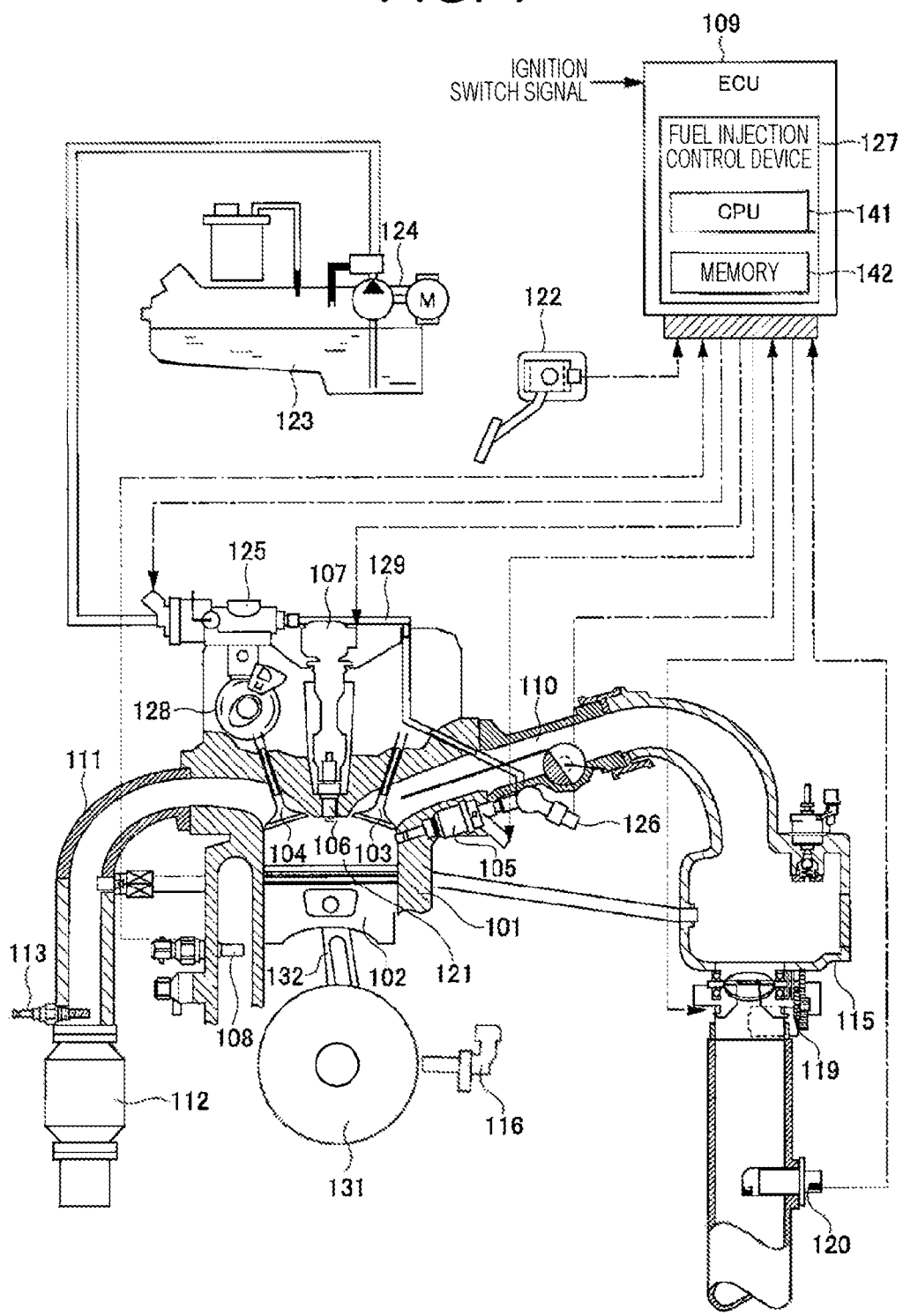
FIG. 1 is an overall configuration diagram showing an example of a basic configuration of an internal combustion engine system including a fuel injection control device according to one embodiment of the present invention.

A configuration of an internal combustion engine system including a fuel injection control device according to one embodiment of the present invention will first be described. FIG. 1 is an overall configuration diagram of the internal combustion engine system including the fuel injection control device according to the one embodiment of the present invention.

The internal combustion engine (engine) 101 shown in FIG. 1 is a four-cycle engine that repeats four strokes: an air intake stroke, a compression stroke, a combustion (expansion) stroke, and an exhaust stroke, and is, for example, a multi-cylinder engine carrying four cylinders. It should be noted that the number of cylinders the internal combustion engine 101 has is not limited to four, and may be any given number of cylinders, such as six or eight or more.

The internal combustion engine 101 includes a piston 102, an air intake valve 103, and an exhaust valve 104. Air taken into the internal combustion engine 101 (intake air) flows through an air flow meter (AFM) 120, which detects the amount of air inflow, and reaches a throttle valve 119, which adjusts a flow rate of incoming air. Air having passed through the throttle valve 119 is sucked into a collector 115, which is a branch portion, and then is supplied to a combustion chamber 121 of each cylinder via an air intake pipe 110 and an air intake valve 103, which are attached to the cylinder.

Meanwhile, a fuel is supplied by a low-pressure fuel pump 124, from a fuel tank 123 to a high-pressure fuel pump 125, which increases the pressure of the fuel to a pressure necessary for fuel injection. Specifically, the high-pressure fuel pump 125 moves up or down a plunger disposed in the high-pressure fuel pump 125, by power transmitted from an exhaust cam shaft (not illustrated) of an exhaust cam 128, thereby pressurizing (increasing the pressure of) the fuel in the high-pressure fuel pump 125.

A suction port of the high-pressure fuel pump 125 is provided with an opening/closing valve driven by a solenoid. The solenoid is connected to a fuel injection control device 127 disposed in an engine control unit (ECU) 109, which is an electronic controller. The fuel injection control device 127 controls the solenoid, based on a control instruction from the ECU 109, and drives the opening/closing valve so that the pressure of the fuel (hereinafter, abbreviated as "fuel pressure") delivered from the high-pressure fuel pump 125 is adjusted to an intended pressure. The ECU 109 (fuel injection control device 127) includes, for example, a CPU 141, a memory 142, and an input/output interface (not illustrated).

The CPU 141 is a processor that carries out arithmetic processing. The memory 142 is a storage unit composed of a volatile or nonvolatile semiconductor memory or the like. The memory 142 may store a computer program for controlling the fuel injection valve 105. In this case, the CPU 141 reads and executes a computer program stored in the memory 142, thereby implementing all or some of functions of the fuel injection control device 127. An ignition switch signal for giving an instruction on the start (ignition) of the internal combustion engine 101 is input to the ECU 109. For example, when detecting the ignition switch signal's being on, the CPU 141 starts processing a computer program for fuel injection control. In place of the CPU 141, a different arithmetic processing unit, such as a micro processing unit (MPU), may be used.

The fuel increased in pressure by the high-pressure fuel pump 125 is sent to the fuel injection valve 105 via a high-pressure fuel pipe 129. The fuel injection valve 105 injects fuel directly into the combustion chamber 121, based on an instruction from the fuel injection control device 127. The fuel injection valve 105 is an electromagnetic valve that injects the fuel when a valve element is operated by supplying a drive current to an electromagnetic coil (i.e., energizing the electromagnetic coil), which will be described later.

The internal combustion engine 101 is provided with a fuel pressure sensor 126 that measures a fuel pressure in the high-pressure fuel pipe 129. Based on a measurement result from the fuel pressure sensor 126, the ECU 109 transmits a control instruction to the fuel injection control device 127, the control instruction being an instruction for adjusting the fuel pressure in the high-pressure fuel pipe 129 to an intended pressure. In other words, the ECU 109 carries out so-called feedback control to adjust the fuel pressure in the high-pressure fuel pipe 129 to the intended pressure.

Each combustion chamber 121 of the internal combustion engine 101 is provided with an ignition plug 106, with an ignition coil 107, and with a water temperature sensor 108. The ignition plug 106 has its electrode exposed in the combustion chamber 121, and ignites a fuel-air mixture, which is a mixture of intake air and the fuel, by discharging in the combustion chamber 121. The ignition coil 107 generates a high voltage for causing the ignition plug 106 to discharge. The water temperature sensor 108 measures the temperature of cooling water for cooling the cylinder of the internal combustion engine 101.

The ECU 109 controls energization of the ignition coil 107 and ignition by the ignition plug 106. In the combustion chamber 121, the fuel-air mixture, which is the mixture of intake air and the fuel, is burned by a spark emitted from the ignition plug 106, and a pressure created by the burning fuel-air mixture pushes the piston 102 down.

An exhaust gas resulting from the burning is discharged to an exhaust pipe 111 through the exhaust valve 104. The exhaust pipe 111 is provided with a three-way catalyst 112 and with an oxygen sensor 113. The three-way catalyst 112 purifies the exhaust gas of harmful substances, such as a nitrogen oxide (NOx). The oxygen sensor 113 detects the concentration of oxygen included in the exhaust gas and outputs a result of the detection to the ECU 109. Based on the detection result from the oxygen sensor 113, the ECU 109 carries out feedback control so that an amount of injection of the fuel supplied from the fuel injection valve 105 becomes an amount of injection that achieves a target fuel-air ratio.

To the piston 102, a crankshaft 131 is connected via a connecting rod 132. Reciprocating motion of the piston 102 is transformed by the crankshaft 131 into rotating motion. The crankshaft 131 is fitted with a crank angle sensor 116. The crank angle sensor 116 detects the rotation and the phase of the crankshaft 131 and outputs a result of the detection to the ECU 109. Based on the detection result outputted from the crank angle sensor 116, the ECU 109 can detect a rotating speed of the internal combustion engine 101.

The ECU 109 is supplied with incoming signals from the crank angle sensor 116, the air flow meter 120, the oxygen sensor 113, an accelerator opening-degree sensor 122, which outputs a signal indicating a degree of opening of an accelerator operated by a driver, the fuel pressure sensor 126, and the like.

Based on a signal supplied from the accelerator opening-degree sensor 122, the ECU 109 calculates a required torque of the internal combustion engine 101 and determines whether it is in an idle state. In addition, the ECU 109 calculates an amount of intake air the internal combustion engine 101 needs, from the required torque and the like, and outputs an opening-degree signal corresponding to the calculated amount of intake air, to the throttle valve 119.

The ECU 109 includes a rotating speed detection unit that calculates a rotating speed (which will hereinafter be referred to as an engine rotating speed) of the internal combustion engine 101, based on a signal supplied from the crank angle sensor 116. The ECU 109 further includes a warm-up determining unit that determines whether the three-way catalyst 112 is in a warmed up state, from the temperature of cooling water that is acquired from the water temperature sensor 108, an elapsed time from the start of the internal combustion engine 101, and the like.

The fuel injection control device 127 calculates a fuel amount corresponding to an intake air amount, and outputs a fuel injection signal corresponding to the calculated fuel amount, to the fuel injection valve 105. In addition, the fuel injection control device 127 outputs an energization signal to the ignition coil 107 and outputs an ignition signal to the ignition plug 106.

[Configuration of Fuel Injection Control Device]

A configuration of the fuel injection control device 127 shown in FIG. 1 will then be described with reference to FIGS. 2 and 3.

Figure 2:
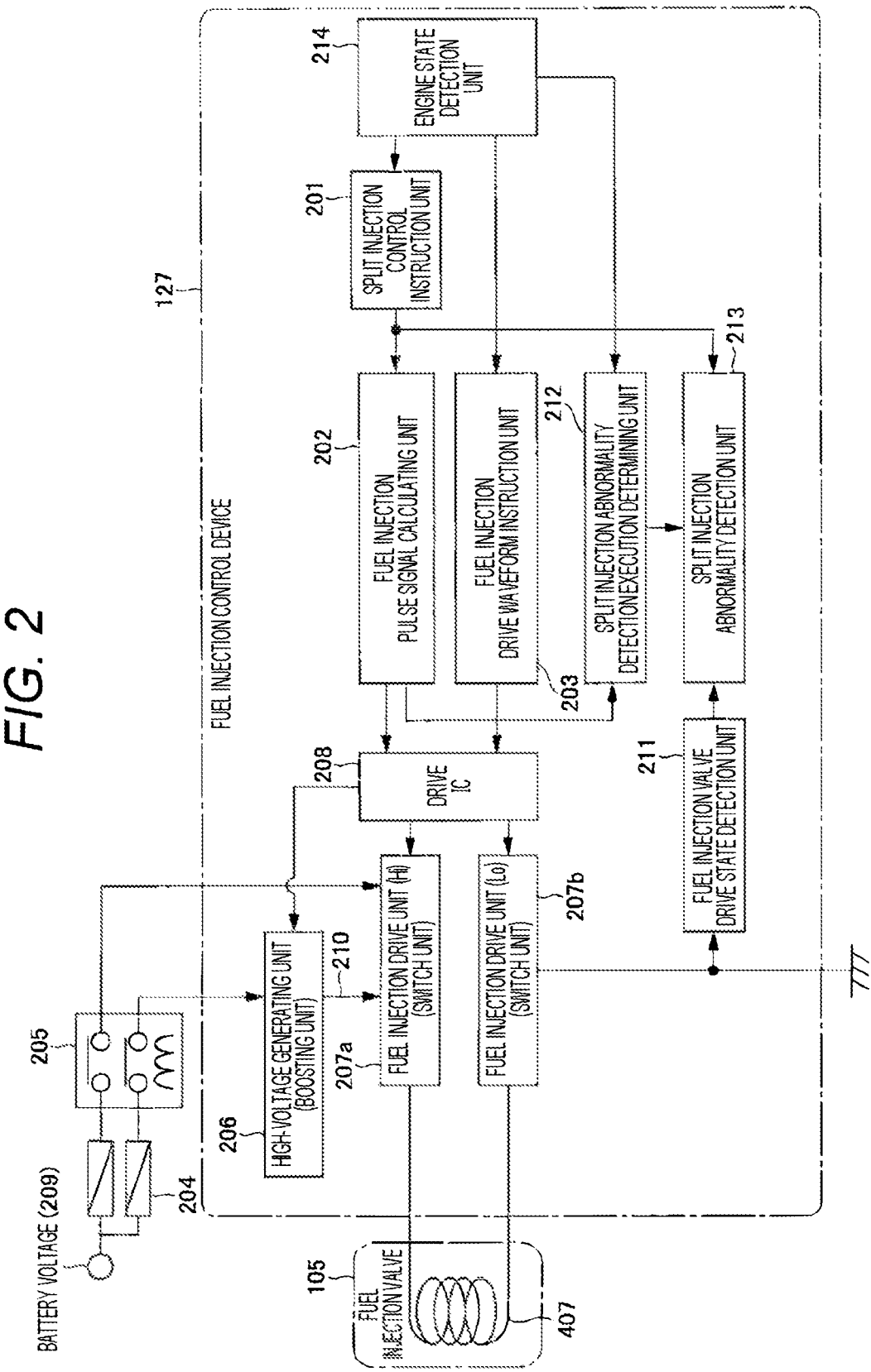
FIG. 2 is a block diagram showing an example of an internal configuration of the fuel injection control device according to the one embodiment of the present invention.

FIG. 2 is a block diagram showing an example of an internal configuration of the fuel injection control device 127. FIG. 3 is a circuit diagram showing an example of a configuration of fuel injection drive units shown in FIG. 2.

As shown in FIG. 2, the fuel injection control device 127 includes a split injection control instruction unit 201, which serves as a fuel injection control unit, a fuel injection pulse signal calculating unit 202, a fuel injection drive waveform instruction unit 203, an engine state detection unit 214, and a drive IC 208. The fuel injection control device 127 further includes a high-voltage generating unit (boosting device) 206, fuel injection drive units 207a and 207b, a fuel injection valve drive state detection unit 211, a split injection abnormality detection execution determining unit 212, and a split injection abnormality detection unit 213.

The engine state detection unit 214 collects and provides various pieces of information, such as an engine rotating speed, an intake air amount, a cooling water temperature, a fuel pressure, and a failure state of the internal combustion engine 101, which have been mentioned above.

The split injection control instruction unit 201 determines whether or not to execute split injection control, according to information on an operation state of the internal combustion engine 101 or a driving scene (e.g., traveling in a city area, traveling on an expressway, and the like), the information being based on pieces of information acquired from the engine state detection unit 214. When split injection control is permitted, the number of times of split injections, a split ratio of a fuel injection amount, a timing of starting each split injection, a fuel injection amount at each split injection, and the like are calculated. As a matter of course, when split injection control is not executed, fuel injection is carried out only once in one combustion cycle.

The fuel injection pulse signal calculating unit 202 (an example of a fuel injection pulse output unit) calculates an injection pulse width that defines a fuel injection period (energization period) of the fuel injection valve 105, based on the above pieces of information, such as the number of times of split injections, the split ratio of the fuel injection amount, and the required fuel injection amount, that are acquired from the split injection control instruction unit 201. The fuel injection pulse signal calculating unit 202 then outputs an injection pulse signal with the calculated injection pulse width, to the drive IC 208 in accordance with an injection start timing.

The fuel injection drive waveform instruction unit 203 calculates an instruction value for a drive current that is supplied to open the fuel injection valve 105 and keep it opened, based on pieces of information, such as a fuel pressure, acquired from the engine state detection unit 214, and outputs the instruction value to the drive IC 208.

To the high-voltage generating unit 206, a battery voltage 209 is supplied via a fuse 204 and a relay 205. Out of the battery voltage 209, the high-voltage generating unit 206 generates a high source voltage 210 (VH), which is needed when the fuel injection valve 105 of an electromagnetic solenoid type is opened. Hereinafter, the source voltage 210 will be referred to as a "boosted voltage 210". The fuel injection valve 105 is supplied with two types of source voltages: the boosted voltage 210 for securing a force to open the valve element and the battery voltage 209 for keeping the valve element opened to prevent the opened valve element from closing.

The fuel injection drive unit 207a (switch unit) is disposed on the upstream side (power supply side or high side) relative to the fuel injection valve 105, and supplies the fuel injection valve 105 with the boosted voltage 210 that is needed to open the fuel injection valve 105. The fuel injection drive unit 207a supplies the fuel injection valve 105 also with the battery voltage 209 that is needed to keep the fuel injection valve 105 in an opened state after opening the fuel injection valve 105.

Figure 3:
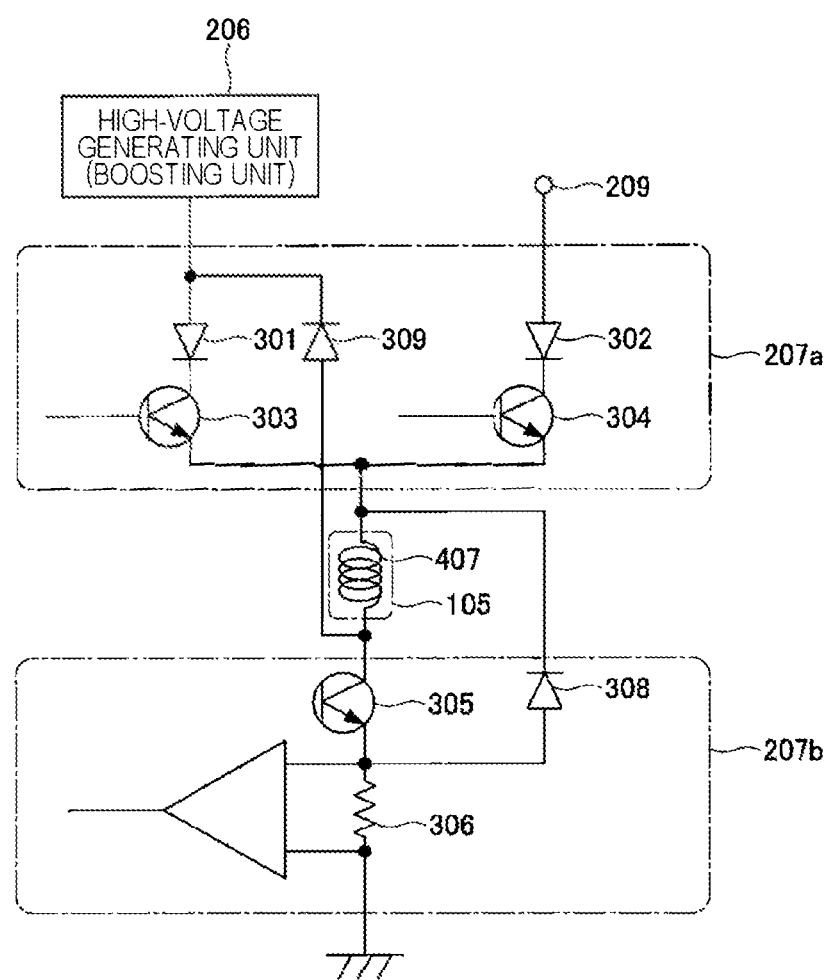
FIG. 3 is a circuit diagram showing an example of a configuration of fuel injection drive units in the fuel injection control device according to the one embodiment of the present invention.

As shown in FIG. 3, the fuel injection drive unit 207a includes diodes 301 and 302, a high-voltage side switching element 303, and a low-voltage side switching element 304. The fuel injection drive unit 207a lets the boosted voltage 210 supplied from the high-voltage generating unit 206 pass through the diode 301, which is provided to prevent current backflow, and supplies the boosted voltage 210 to the fuel injection valve 105, using the high-voltage side switching element 303.

The fuel injection drive unit 207a lets the battery voltage 209 supplied via the relay 205 pass through the diode 302, which is provided to prevent current backflow, and supplies the battery voltage 209 to the fuel injection valve 105, using the low-voltage side switching element 304.

The fuel injection drive unit 207b (switch unit) is disposed on the downstream side relative to the fuel injection valve 105 (ground side or low side), and includes a switching element 305 and a shunt resistor 306. By switching the switching element 305 on, the fuel injection drive unit 207b applies a source voltage supplied from the fuel injection drive unit 207a on the upstream side, to the fuel injection valve 105. In addition, through the shunt resistor 306, the fuel injection drive unit 207b detects a current consumed by the fuel injection valve 105.

The drive IC 208 shown in FIG. 2 controls the fuel injection drive units 207a and 207b, based on an injection pulse width calculated by the fuel injection pulse signal calculating unit 202 and based on a drive current waveform (drive current profile) calculated by the fuel injection drive waveform instruction unit 203. In other words, the drive IC 208 controls the boosted voltage 210 and battery voltage 209 applied to the fuel injection valve 105, thus controlling a drive current supplied to the fuel injection valve 105.

A diode 309 is connected in a forward direction between the downstream side to a solenoid 407 and the high-voltage generating unit 206, and a diode 308 is connected in the forward direction between the shunt resistor 306 and the upstream side to the solenoid 407. When the high-voltage side switching element 303, the low-voltage side switching element 304, and the switching element 305 are switched off, a counter electromotive force is generated by the solenoid 407 of the fuel injection valve 105, and this counter electromotive force causes the diode 308 and the diode 309 to carry current flows. As a result, a current is fed back to the high-voltage generating unit 206, which causes the drive current supplied to the solenoid 407 to decrease rapidly. At this time, a voltage with a reverse polarity (−VH) that is equivalent in size, for example, to the boosted voltage 210 is generated as a counter electromotive force, between the terminals of the solenoid 407.

The fuel injection valve drive state detection unit 211 (an example of a drive state detection unit) monitors a current flowing through the fuel injection valve 105 (solenoid 407), and detects the current's having reached a given current value or not reaching the given current value. The fuel injection valve drive state detection unit 211 then outputs an energization detection signal as a result of the detection, to the split injection abnormality detection unit 213. The fuel injection valve drive state detection unit 211 may detect a drive state of the fuel injection valve by measuring a voltage applied to the fuel injection valve 105 (solenoid 407).

The split injection abnormality detection execution determining unit 212 (an example of the injection abnormality detection execution determining unit) determines whether or not to permit execution of split injection abnormality detection by the split injection abnormality detection unit 213, based on information inputted from the engine state detection unit 214, the fuel injection pulse signal calculating unit 202, and the like. The split injection abnormality detection execution determining unit 212 then outputs a result of determination on whether or not to permit execution of split injection abnormality detection (a permission signal or non-permission signal), to the split injection abnormality detection unit 213.

When given permission to execute the split injection abnormality detection by the split injection abnormality detection execution determining unit 212, the split injection abnormality detection unit 213 (an example of an injection abnormality detection unit) executes the split injection abnormality detection. The split injection abnormality detection unit 213 compares an energization detection signal (energized state) detected by the fuel injection valve drive state detection unit 211 with an injection start timing (fuel injection instruction) calculated by the split injection control instruction unit 201 to carry out abnormality determination. In other words, the split injection abnormality detection unit 213 determines whether a current flows to the solenoid 407 of the fuel injection valve 105 or a voltage is applied to the solenoid 407 in a manner specified by a fuel injection instruction.

Details of the fuel injection valve drive state detection unit 211, the split injection abnormality detection execution determining unit 212, and the split injection abnormality detection unit 213 will be described later.

[Method of Driving Fuel Injection Valve]

A method of driving the fuel injection valve 105 will then be described with reference to FIG. 4.

Figure 4:
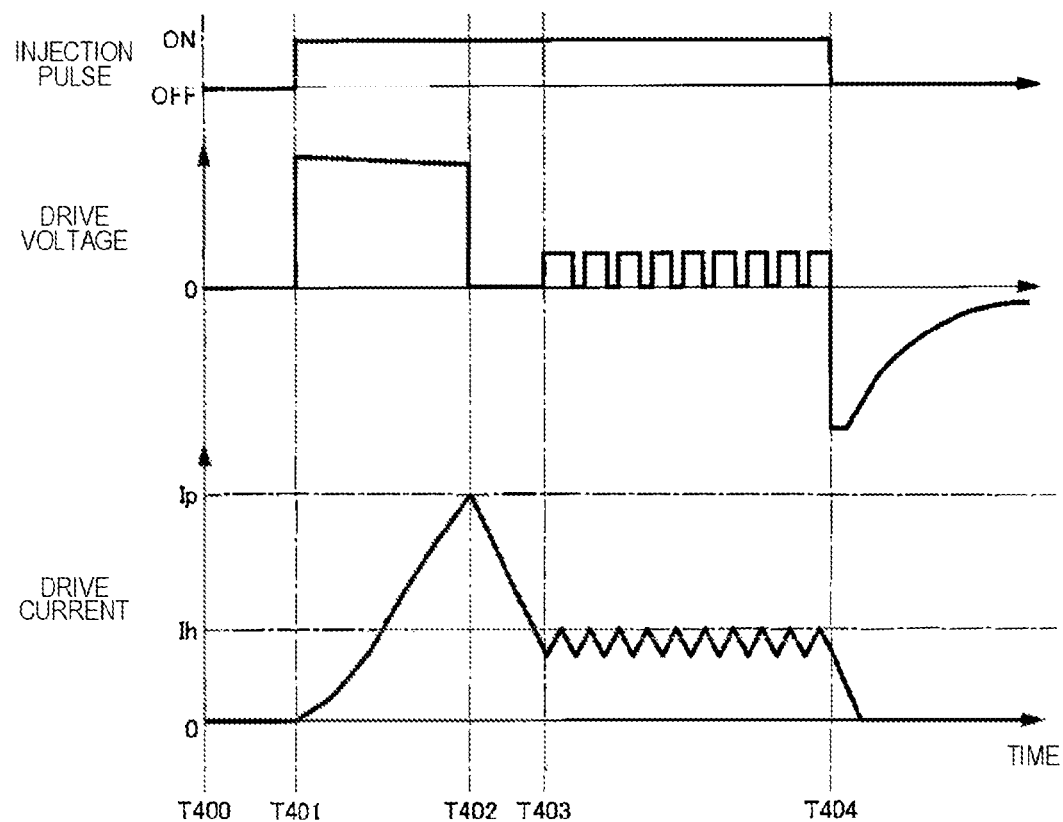
FIG. 4 is a timing chart for explaining a method of driving a fuel injection valve according to the one embodiment of the present invention.

FIG. 4 is a timing chart for explaining a method of driving the fuel injection valve 105. In the timing chart, the horizontal axis represents time and the vertical axis represents an injection pulse, a drive voltage, and a drive current.

FIG. 4 shows an example of an injection pulse, a drive voltage, and a drive current that are plotted in a time series manner, the injection pulse, drive voltage, and drive current being outputted when the fuel is injected from the fuel injection valve 105. When the fuel injection valve 105 is driven, current setting values (a peak current Ip, a holding current Ih, and the like) are set in advance, based on the characteristics of the fuel injection valve 105. Then, the injection amount characteristics of the fuel injection valve 105 that are determined by the current setting values are stored in the memory 142 (e.g., a RAM) disposed in the ECU 109. The fuel injection control device 127 calculates an injection pulse to the fuel injection valve 105, from an operation state of the internal combustion engine 101 and the injection amount characteristics of the fuel injection valve 105.

From time T400 to time T401 shown in FIG. 4, an injection pulse outputted from the fuel injection pulse signal calculating unit 202 (see FIG. 2) is in an off-state. This puts the fuel injection drive units 207a and 207b in the off-state, in which case no drive current flows through the fuel injection valve 105. The fuel injection valve 105, therefore, does not inject the fuel.

Subsequently, at time T401, the injection pulse switches on, which puts the fuel injection drive unit 207a (switching element 303) and the fuel injection drive unit 207b (switching element 305) in an on-state. As a result, the boosted voltage 210 (drive voltage) is applied to the solenoid 407 and therefore a drive current flows through the solenoid 407 (fuel injection valve 105). When the drive current flows through the fuel injection valve 105, the valve element starts to move in a valve opening direction to open the fuel injection valve 105. Hence the fuel injection valve 105 injects the fuel.

When the drive current reaches the peak current Ip (time T402), the switching elements 303 and 304 of the fuel injection drive units 207a and 207b are switched off to reduce the drive current flowing through the fuel injection valve 105.

Then, from time T403 to time T404 at which the injection pulse falls, the fuel injection drive unit 207b (switching element 305) is kept in the on-state as the fuel injection drive unit 207a (switching element 304) is intermittently switched on. In other words, the fuel injection drive unit 207a is put under pulse width modulation (PMW) control to intermittently adjust the drive voltage, which is applied to the fuel injection valve 105, to the voltage equal to the battery voltage 209. This confines the drive current flowing through the fuel injection valve 105 to a given range around the holding current Ih.

At time T404, the injection pulse switches off. This puts both fuel injection drive units 207a and 207b in the off-state, and therefore the drive voltage applied to the solenoid 407 decreases and consequently the drive current flow decreases, too. Then, the valve element moves in a valve closing direction to close the fuel injection valve 105. The fuel injection valve 105 thus stops injecting the fuel.

It should be noted that from time T404 at which the injection pulse switches off, the boosted voltage 210 is supplied in a direction opposite to a direction in which the boosted voltage 210 is supplied to drive the fuel injection valve 105. This is done so that residual magnetism in the fuel injection valve 105 is quickly removed to cause the fuel injection valve 105 to close swiftly.

[Split Injection Control]

Split injection control will then be described with reference to FIG. 5.

Figure 5:
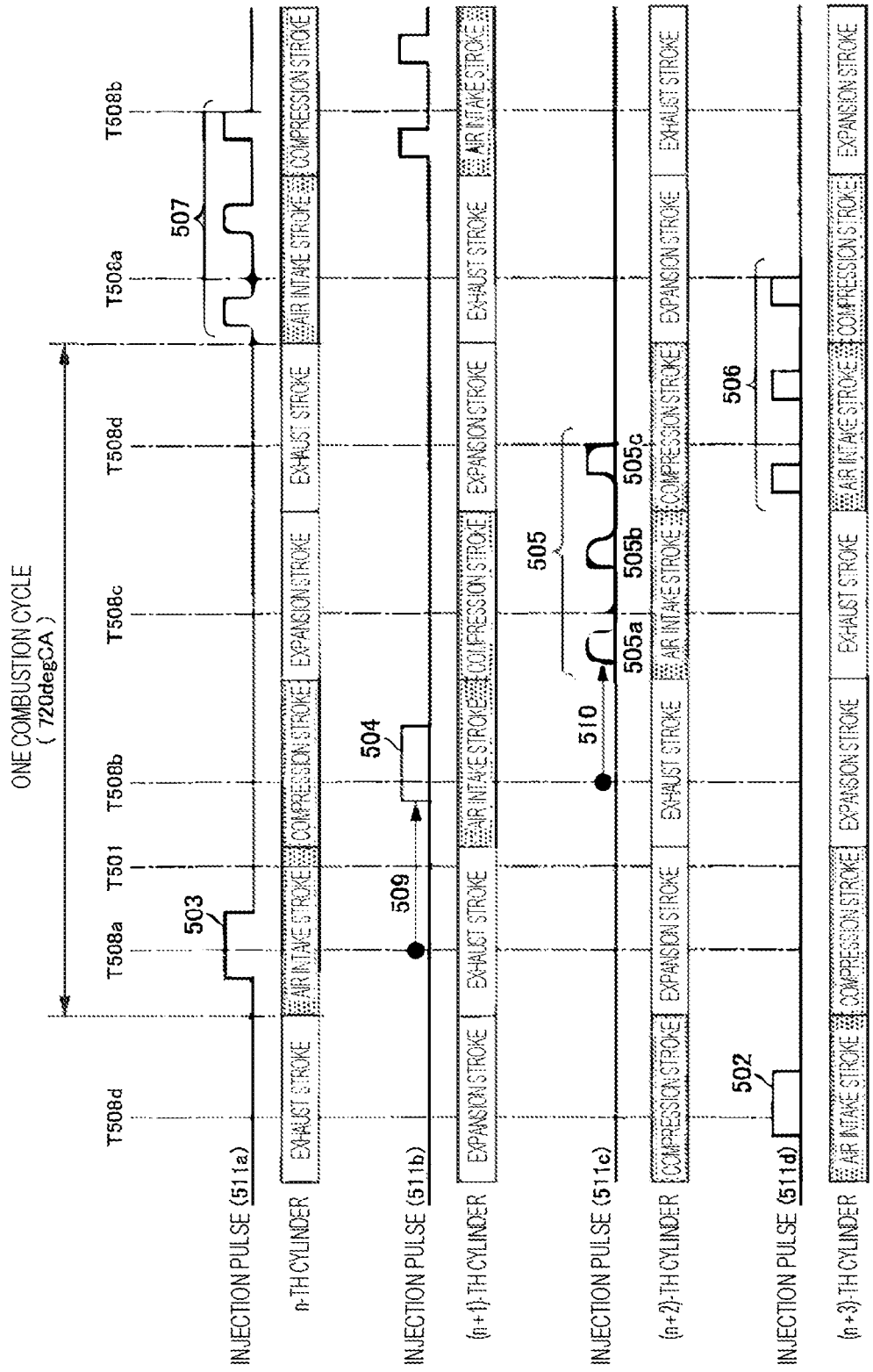
FIG. 5 is a chart for explaining single injection control and split injection control according to the one embodiment of the present invention.

FIG. 5 is a chart for explaining single injection control and split injection control. FIG. 5 shows waveforms of injection pulses 511 at the time of switching from the single injection control to the split injection control, denoting injection pulses to n-th to (n+3)-th cylinders as injection pulses 511a to 511d, respectively. Time T501 in the chart represents a point of time at which the split injection control is permitted (for example, the number of times of split injections changes from 1 to 3).

Now, to drive the fuel injection valve 105 on the basis of a given crank angle, a general method for angle control is implemented, according to which control reference positions (T508a to T508d) are set for each cylinder, and a control timing of the fuel injection valve 105 is determined at an intended angle based on each control reference position.

Based on this fact, what is shown FIG. 5 will be described. In the past to time T501 (a time zone on the left side with respect to time T501), the split injection control is not executed and injection is executed once. An injection pulse T502 to the (n+3)-th cylinder is outputted at time T508d, and an injection pulse 503 to the n-th cylinder is outputted at time T508a. In other words, fuel injection is executed once in one combustion cycle. An injection pulse 504 to the (n+1)-th cylinder which is in the future (in a time zone on the right side with respect to time T501) to a control reference position (time T501) is in a time zone on the left side and injection control at this point of time is executed according to the injection start timing 509. Fuel injection into the (n+1)-th cylinder is, therefore, executed as single injection.

Meanwhile, at time T508b, which is the first control reference position to ensue from time T501, an injection instruction 505 (split injection instructions 505a, 505b, and 505c) is issued at an injection start timing 510 for split injection. As a result, split injection is executed after the injection start timing 510. Thereafter, the split injection control is continued to carry out the same control as control according to the injection instruction 505. At issuance of an injection instruction 506 and an injection instruction 507, therefore, split injection is executed in the same manner.

The split injection control shown FIG. 5 is executed as a process of performing injection three times (e.g., the split injection instructions 505a to 505c). Even if the number of times of injection is different from three times, the basic control method remains the same.

Split injection is defined as a process of performing fuel injection at least twice or more in one combustion cycle. Although each cylinder takes a different position (angle) in its combustion cycle, one combustion cycle is generally defined as, for example, a stroke of 720 degrees in which a four-cycle internal combustion engine completes its full combustion stroke (air intake, compression, expansion, exhaust). It should be noted, however, that a method of determining an abnormality of a split injection function according to the present invention applies not only to the case of split injection but also to the case of performing fuel injection once during one combustion cycle.

[Abnormal State of Split Injection]

An abnormal state of split injection will then be described.

An abnormal state refers to a state in which fuel injection is not executed according to an injection instruction. Such an abnormal state includes a state in which "the fuel injection is not executed", a state in which "fuel injection is executed despite no instruction value being present", and a state in which "a timing of fuel injection is shifted relative to an instruction value".

The abnormal state "fuel injection is not executed" is, for example, a case where in response to an injection parameter calculated by the split injection control instruction unit 201, fuel injection is not executed because of an abnormality occurred between the fuel injection pulse signal calculating unit 202 and the fuel injection valve 105. In other words, this abnormal state is a state in which no voltage is applied to the fuel injection valve 105 (solenoid 407) and consequently no current flows through the fuel injection valve 105. It should be noted that this state includes a case where despite the fuel injection valve 105 carrying a current, the current cannot be detected by the fuel injection valve drive state detection unit 211 because the current flows through a short circuit to the ground on the downstream side to the fuel injection valve 105.

The abnormal state "fuel injection is executed despite no instruction value being present" is a state in which despite the split injection control instruction unit 201 not requesting fuel injection (e.g., a required injection amount is zero), a voltage is applied to the fuel injection valve 105 to cause a current to flow through the fuel injection valve 105.

In other words, the abnormal states "the fuel injection is not executed" and "fuel injection is executed despite no instruction value being present" are each interpreted as a state in which split injection is not executed the number of times specified by an injection instruction.

The abnormal state "a timing of fuel injection is shifted relative to an instruction value" is an abnormal state in which a voltage is applied to the fuel injection valve 105 earlier (shifted in an advance direction) or later (shifted in a lag direction) than a required injection timing calculated by the split injection control instruction unit 201 and a current flows through the fuel injection valve 105 in a shifted timing.

[Fuel Injection Valve Drive State Detection Unit]

The fuel injection valve drive state detection unit 211 will then be described with reference to FIG. 6.

Figure 6:
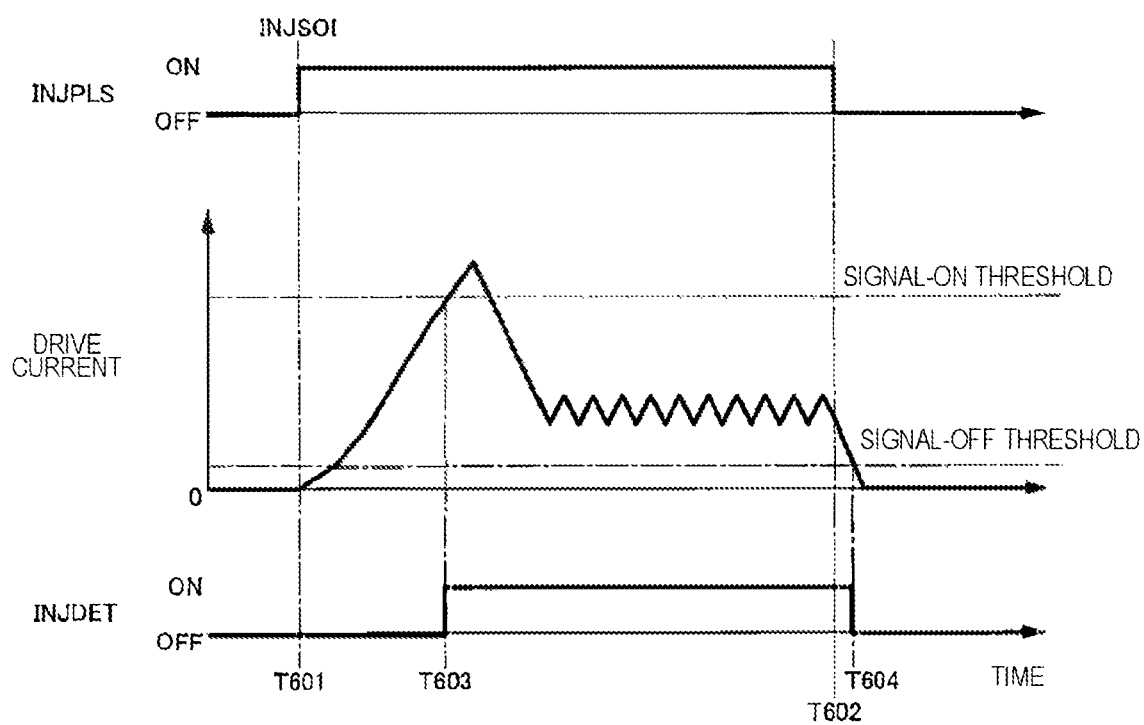
FIG. 6 is a timing chart for explaining a drive current detection signal of the fuel injection valve according to the one embodiment of the present invention.

FIG. 6 is a timing chart for explaining a drive current detection signal of the fuel injection valve 105.

The fuel injection valve drive state detection unit 211 detects the fuel injection valve 105 having executed fuel injection or not executing fuel injection. For each injection, the fuel injection pulse signal calculating unit 202 outputs an injection pulse. A voltage from the high-voltage generating unit 206 or the battery voltage 209 is applied to the fuel injection valve 105, where a current flows to execute fuel injection.

As shown in FIG. 6, the fuel injection pulse signal calculating unit 202 puts an injection pulse INJPLS in the on-state at an injection start timing INJSOI calculated by the split injection control instruction unit 201. When the injection pulse is switched on, a high-level signal is transmitted to the drive IC 208 (T601), which causes a current to flow through the fuel injection valve 105. Then, after an elapse of a given injection time, a low-level signal is transmitted to the drive IC 208 at a point of time of stopping injection output (T602).

The fuel injection valve drive state detection unit 211 measures a drive current flowing through the fuel injection valve 105 (solenoid 407) through, for example, the shunt resistor 306, and generates a drive current detection signal INJDET. The drive current detection signal INJDET is a signal indicating whether the drive current is supplied to the fuel injection valve 105. The fuel injection valve drive state detection unit 211 outputs the generated drive current detection signal INJDET to the split injection abnormality detection unit 213.

The fuel injection valve drive state detection unit 211 switches the drive current detection signal INJDET to a high-level signal (T603) at a point of time at which the drive current flowing through the fuel injection valve 105 increases to become equal to or larger than a given value (signal-on threshold), and switches the drive current detection signal INJDET to a low-level signal (T604) at a point of time at which the drive current decreases to become equal to or smaller than a given value (signal-off threshold).

The given value for switching the drive current detection signal INJDET to the high-level signal and that for switching the drive current detection signal INJDET to the low-level signal are determined in advance by a test or the like and are stored in the memory 142. When the drive current (e.g., the peak current value) is changed based on a fuel pressure, the given value for switching the drive current detection signal INJDET to the high-level signal is changed according to the fuel pressure or is determined to be equal to or smaller than a minimum peak current value under each fuel pressure condition.

The drive current detection signal INJDET is switched to either the high-level signal or the low-level signal because these signals indicate signal states reverse to each other. The following description will be made on the assumption that when energization of the fuel injection valve is detected, the drive current detection signal INJDET is in the on-state (high-level signal) and when the fuel injection valve is not energized, the drive current detection signal INJDET is in the off-state (low-level signal).

[Split Injection Abnormality Detection Unit]

The split injection abnormality detection unit 213 will be described with reference to FIG. 7.

Figure 7:
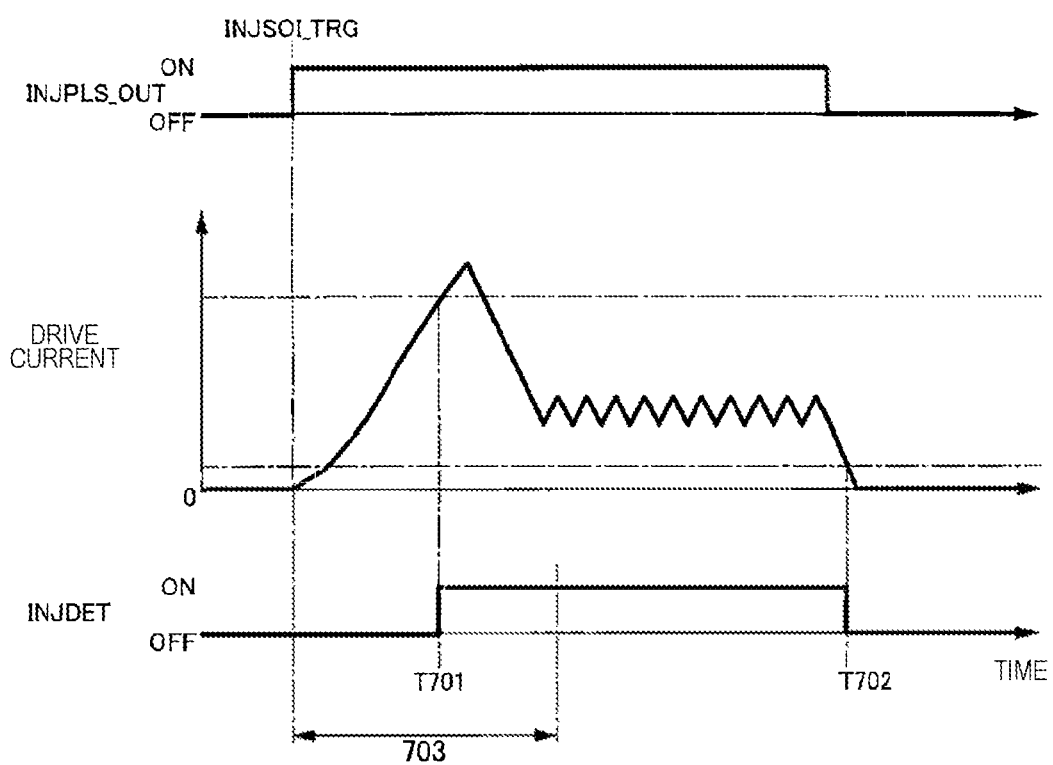
FIG. 7 is a timing chart for explaining an operation of a split injection abnormality detection unit according to the one embodiment of the present invention.

FIG. 7 is a timing chart for explaining an operation of the split injection abnormality detection unit 213. An injection start timing INJSOI_TRG is a target injection start timing outputted from the split injection control instruction unit 201, and an injection pulse INJPLS_OUT is an injection pulse signal outputted from the fuel injection pulse signal calculating unit 202.

The split injection abnormality detection unit 213 detects the split injection abnormality described above. The split injection abnormality detection unit 213 compares the injection start timing INJSOI_TRG calculated by the split injection control instruction unit 201 with the drive current detection signal INJDET generated by the fuel injection valve drive state detection unit 211, and determines the presence or absence of an abnormality, based on a difference between the injection start timing INJSOI_TRG and the drive current detection signal INJDET. This abnormality detection process is carried on all injection pulses generated.

As described above, information on the injection start timing INJSOI_TRG and a fuel injection amount that are calculated by the split injection control instruction unit 201 is transmitted to the fuel injection pulse signal calculating unit 202, which transforms the fuel injection amount into an injection pulse width (energization time). When the engine rotates and a crank angle becomes an angle for the injection start timing INJSOI_TRG, the fuel injection pulse signal calculating unit 202 puts the injection pulse INJPLS_OUT in the on-state and outputs the injection pulse INJPLS_OUT to the drive IC 208 (T701). According to the injection pulse INJPLS_OUT, a drive current flows through the fuel injection valve 105. The fuel injection valve drive state detection unit 211 measures the drive current, and when the drive current value becomes equal to or larger than the given value, puts the drive current detection signal INJDET in the on-state. The fuel injection valve drive state detection unit 211 saves a timing at which the drive current detection signal INJDET has switched on. Timing refers to the injection start timing INJSOI_TRG and a crank angle based on a control reference position.

The drive current detection signal INJDET indicates a measurement of a current flowing through the fuel injection valve 105. This current, however, rises with a delay corresponding to a time constant because of the influence of the inductance of the fuel injection valve 105 (solenoid 407). A timing (rising timing) at which the drive current detection signal INJDET switches on is, therefore, delayed against the injection start timing INJSOI_TRG even if no abnormality has occurred. In this manner, even in a normal situation, a time difference arises between the injection start timing INJSOI_TRG and the timing at which the drive current detection signal INJDET switches on.

For the above reason, in abnormality detection, whether the difference between the injection start timing INJSOI_TRG and the timing at which the drive current detection signal INJDET switches on is within a given range 703 is determined. When the drive current detection signal INJDET switches on within the given range 703 from the injection start timing INJSOI_TRG, a determination "normal" is made. When the drive current detection signal INJDET does not switch on within the given range 703, a determination "abnormal" is made.

The delay in the timing at which the drive current detection signal INJDET switches on is determined according to a voltage applied to the fuel injection valve 105 and the temperature, resistance, and inductance of the fuel injection valve 105. In other words, it is desirable that a range in which a wrong split injection abnormality diagnosis is avoided even if a constant, a voltage value, and the like of a circuit element vary be defined in advance by a test and be stored in the memory 142.

As described above, the injection abnormality detection unit (split injection abnormality detection unit 213) compares a target output timing (injection start timing INJSOI_TRG) of an injection pulse signal, the target output timing being specified by a fuel injection instruction, with a rising timing of a drive current detection signal (drive current detection signal INJDET) outputted from the drive state detection unit (fuel injection valve drive state detection unit 211), the drive current detection signal indicating a drive state of the fuel injection valve, and detects an injection abnormality of the fuel injection valve, based on a difference between both timings.

[Method of Detecting Split Injection Abnormality]

A method of detecting split injection abnormality will then be described with reference to FIG. 8.

Figure 8:
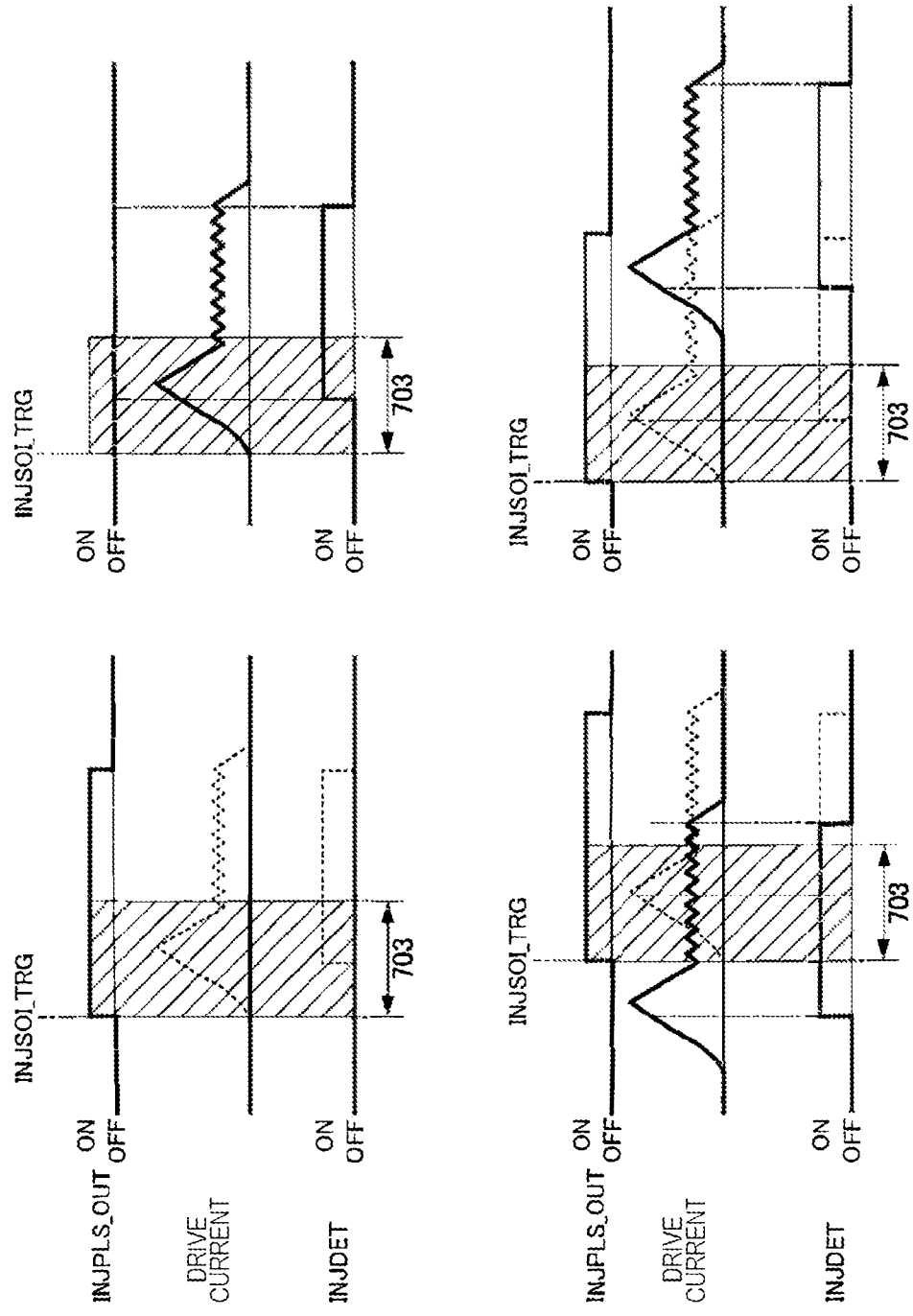
FIG. 8 is a diagram for explaining abnormal states that can be detected by the split injection abnormality detection unit according to the one embodiment of the present invention.

FIG. 8 is a diagram for explaining abnormal states that can be detected by the split injection abnormality detection unit 213. Broken lines represent waveforms that result when normal injection is performed, and solid lines represent waveforms that result when abnormal injection is performed.

An abnormal state "fuel injection is not executed" is, for example, a case where despite that the split injection control instruction unit 201 issues a fuel injection instruction (e.g., a fuel injection amount is not zero), the drive current detection signal INJDET does not switch on within the given range 703 from the injection start timing INJSOI_TRG. In this case, a current does not flow to the fuel injection valve 105 because the injection pulse INJPLS_OUT is not outputted due to an abnormality of the fuel injection pulse signal calculating unit 202 or because of an abnormality of a drive circuit, an abnormality of the fuel injection valve 105, or the like. The fuel injection valve drive state detection unit 211, therefore, cannot measure the current, and consequently the drive current detection signal INJDET does not switch on (a state shown on the upper left in FIG. 8). It should be noted that the drive circuit includes, for example, blocks and lines that follow the drive IC 208.

An abnormal state "fuel injection is executed despite no instruction value being present" is a case where despite that the split injection control instruction unit 201 issues no fuel injection instruction (e.g., a required injection amount is zero), the drive current detection signal INJDET switches on. This is a case where the injection pulse INJPLS_OUT is outputted because of an abnormality of the fuel injection pulse signal calculating unit 202 or a current flows to the fuel injection valve 105 because of an abnormality of the drive circuit (a state shown on the upper right in FIG. 8). In this case, the abnormal state can be detected by comparing the injection start timing INJSOI_TRG of the previous round of injection with a timing at which the drive current detection signal INJDET switches on.

An abnormal state "a timing of fuel injection is shifted relative to an instruction value" arises when a drive current flows through the fuel injection valve 105 earlier or later than the injection start timing INJSOI_TRG specified by the split injection control instruction unit 201. In this case, the drive current detection signal INJDET switches on earlier than the injection start timing INJSOI_TRG (a state shown in the lower left in FIG. 8), or the drive current detection signal INJDET switches on later than the given range 703 (a state shown on the lower right in FIG. 8). A timing at which the drive current flows to the fuel injection valve 105 changes because of an abnormality of the fuel injection pulse signal calculating unit 202, an abnormality of the drive circuit, or the like.

By determining the occurrence of each of the above states (abnormal states) for each injection pulse and for each drive current detection signal INJDET, a split injection abnormality can be detected. In a different approach, pieces of information may be temporarily stored in the memory 142 (RAM or the like) and the occurrence of split injection abnormality may be determined at regular intervals, such as intervals between control reference positions.

For example, injection start timings INJSOI_TRG the number of which matches the number of times of injection performed in one combustion cycle at timings of control reference positions or the like are saved (three injection start timings INJSOI_TRG are saved when split injection is performed three times). In addition, every time the drive current detection signal INJDET switches on, information on switching on timing (time and angle) is stored in the RAM. Then, each injection start timing INJSOI_TRG and each drive current detection signal INJDET are compared at the next control reference position. This makes sequential processing unnecessary, and allows distinguishing an advance abnormality from an increment abnormality.

[Split Injection Abnormality Detection Execution Determining Unit]

The split injection abnormality detection execution determining unit 212 will then be described with reference to FIG. 9.

The split injection abnormality detection execution determining unit 212 determines whether or not to permit execution of split injection abnormality detection by the split injection abnormality detection unit 213. When the split injection abnormality detection execution determining unit 212 determines permission to execution of the split injection abnormality detection, the split injection abnormality detection unit 213 executes the split injection abnormality detection. The split injection abnormality detection unit 213 gives a determination "abnormal" when a difference between the injection start timing INJSOI_TRG and the timing at which the drive current detection signal INJDET switches on is large, and gives a determination "normal" when the difference between both timings is small.

When not permitting execution of the split injection abnormality detection is determined, on the other hand, the injection start timing INJSOI_TRG and the timing at which the drive current detection signal INJDET switches on are detected, and even when the difference between both timings is larger than the given range 703, an abnormality determination is not made. Even when the difference between both timings is smaller than the given range 703, that is, within the given range 703, a normality determination is not made. The above process itself, i.e., the process of comparing the difference between both timings with the given range 703 may not be executed.

As described above, there is a case where even if the split injection function has no abnormality, the timing at which the drive current detection signal INJDET switches on does not stay in the given range 703 from the injection start timing INJSOI_TRG. Such a case raises a possibility that the split injection abnormality detection unit 213 determines that the split injection function is in an abnormal state despite the fact that the split injection function actually has no abnormality.

To prevent such a case, the split injection abnormality detection execution determining unit 212 detects a case where the split injection function may possibly be determined to be in an abnormal state despite the split injection function's being in a normal state, and carries out control for avoiding erroneous abnormality determination.

(Split Injection Abnormality Determination that is Executed Depending on Injection Interval)

Split injection abnormality determination that is executed depending on an injection interval will first be described with reference to FIG. 9.

Figure 9:
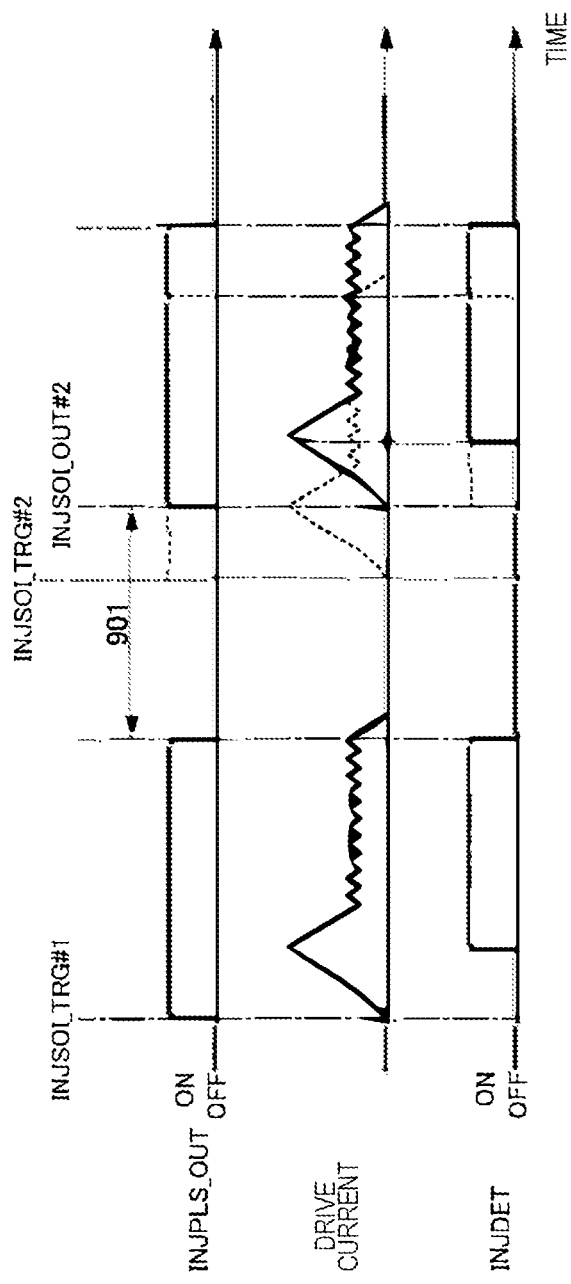
FIG. 9 is a timing chart for explaining a case where split injection abnormality determination is not executed, depending on an injection interval according to the one embodiment of the present invention.

FIG. 9 is a timing chart for explaining a case where split injection abnormality determination is not executed, depending on an injection interval. Broken lines represent waveforms that result when an injection interval is short, and solid lines represent waveforms that result when the injection interval is long.

The injection interval is determined by taking into consideration a valve closing time of the fuel injection valve 105 and a boosted voltage charging time. The injection start timing INJSOI_TRG and a fuel injection amount that are calculated by the split injection control instruction unit 201 are transformed into an injection pulse width, which is outputted from the fuel injection pulse signal calculating unit 202 to the drive IC 208. At this time, when an interval between an off-timing of the previous injection pulse and a current injection start timing INJSOI_TRG #2 is shorter than a preset injection interval 901, the injection start timing INJSOI_TRG #2 is shifted to the lag side to make the interval equal to or longer than the injection interval 901. The resulting injection start timing is defined as an injection start timing INJSOI OUT #2. This makes it possible to avoid a delay in fuel injection caused by starting energization at the time of a drop in the boosted voltage 210 or the current fuel injection's overlapping the previous fuel injection.

However, because an actual injection start timing is delayed to be later than the injection start timing INJSOI_TRG calculated by the split injection control instruction unit 201, a timing at which the drive current detection signal INJDET switches on is also delayed. As a result, the on-timing of the drive current detection signal INJDET does not stay in the given range 703 from the injection start timing INJSOI_TRG, which raises a possibility that an abnormality determination is made. For this reason, when the on-timing of the injection pulse, i.e., the injection start timing INJSOI_TRG is delayed by injection interval adjustment, determination on an abnormality of the split injection function is not carried out.

The higher the rotating speed of the engine (internal combustion engine 101) is, the shorter the injection interval is. For this reason, when the rotating speed of the internal combustion engine is equal to or higher than a given value, the injection abnormality detection execution determining unit (injection abnormality detection execution determining unit 212) may not permit execution of the injection abnormality detection by the injection abnormality detection unit (split injection abnormality detection unit 213).

As described above, in the fuel injection control device (fuel injection control device 127) according to this embodiment, the injection abnormality detection execution determining unit (injection abnormality detection execution determining unit 212) does not permit execution of the injection abnormality detection by the injection abnormality detection unit (split injection abnormality detection unit 213) when an interval (injection interval 901) between a target stop timing of an injection pulse signal in the previous round of injection and a target output timing (injection start timing INJSOI_TRG) of an injection pulse signal in the current round of injection is shorter than a given value.

(Split Injection Abnormality Determination that is Executed Depending on Injection Pulse Width)

Split injection abnormality determination that is executed depending on an injection pulse width will then be described with reference to FIG. 10.

The fuel injection pulse signal calculating unit 202 calculates an injection pulse width, based on a fuel injection amount calculated by the split injection control instruction unit 201. Because an injection pulse width represents an energization time of the fuel injection valve 105, a longer injection pulse width, i.e., a longer energization time means a larger fuel injection amount and a shorter injection pulse width means a smaller fuel injection amount. When the fuel injection amount is small, therefore, the injection pulse width is short.

The fuel injection amount varies depending on fuel pressures, too. The higher the fuel pressure is, the larger the fuel injection amount per unit time becomes. For this reason, to meet a required fuel injection amount, the injection pulse width is usually changed according to the fuel pressure. In other words, as the fuel pressure gets higher with respect to the fuel pressure corresponding to the required fuel injection amount, the injection pulse width is controlled to be shorter.

Figure 10:
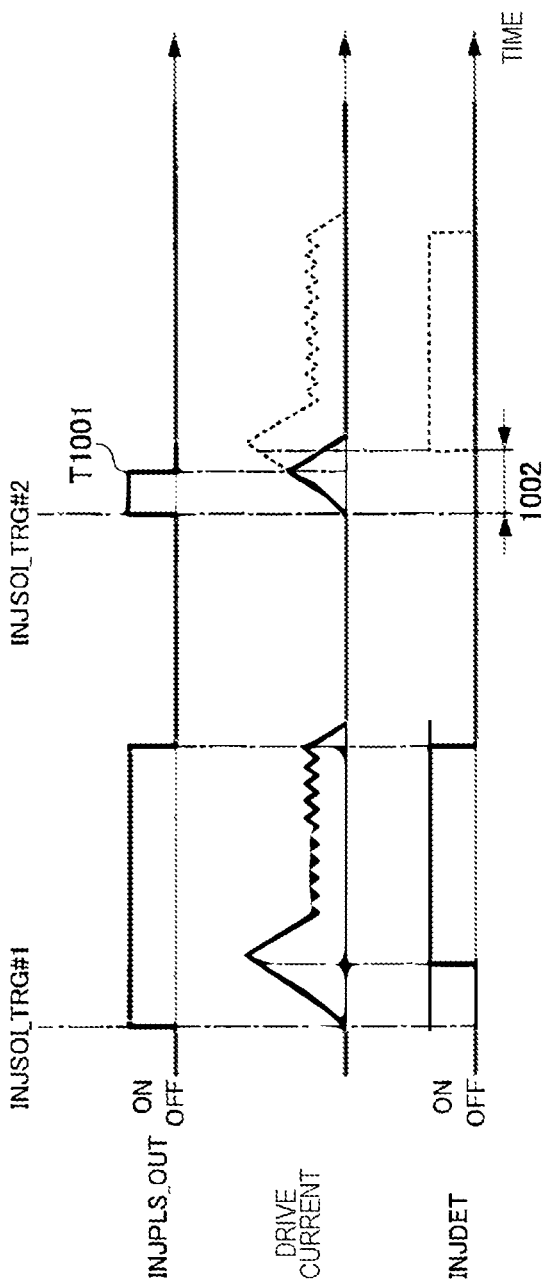
FIG. 10 is a timing chart for explaining a case where split injection abnormality determination is not executed, depending on an injection pulse width according to the one embodiment of the present invention.

FIG. 10 is a timing chart for explaining a case where split injection abnormality determination is not executed, depending on an injection pulse width. Broken lines represent waveforms that result when the injection pulse width is long, and solid lines represents waveforms that result when the injection pulse width is short.

As shown in FIG. 10, when the injection pulse width is short, there is a possibility that current supply to the fuel injection valve 105 is stopped before a drive current reaches a signal-on threshold. At the injection start timing INJSOI_TRG #2, an injection pulse is outputted, causing the drive current to start flowing through the fuel injection valve 105. When output of the injection pulse is stopped at a timing T1001, current supply to the fuel injection valve 105 is stopped. At this point, because current supply is stopped before the drive current reaches the signal-on threshold, the drive current energization signal INJDET does not switch on. The drive current energization signal INJDET thus fails to switch on within the given range 703 from the injection start timing INJSOI_TRG. Because of this, an abnormal determination is made despite the split injection function having no abnormality.

When the injection pulse width is shorter than a given value 1002, therefore, determination on an abnormality of the split injection function is not carried out. The given value 1002 is equal to or more than a time to take from a point of arrival of the injection start timing INJSOI_TRG to a point of the drive current energization signal INJDET switching on. This given value 1002 is calculated in advance by a test and is stored in the memory 142.

As described above, in the fuel injection control device (fuel injection control device 127) according to this embodiment, the injection abnormality detection execution determining unit (injection abnormality detection execution determining unit 212) does not permit execution of the injection abnormality detection by the injection abnormality detection unit (split injection abnormality detection unit 213) when the width of an injection pulse signal (injection pulse width), the width being specified by an energization time instruction to the fuel injection valve, is shorter than a given value.

(Split Injection Abnormality Determination that is Executed Depending on Boosted Voltage)

Split injection abnormality determination that is executed depending on the boosted voltage 210 will then be described with reference to FIG. 11.

When the boosted voltage 210 is low, a time to take from a point of a drive current's starting to flow through the fuel injection valve 105 to a point of the drive current's reaching a peak current is long. For example, when the engine rotating speed is high or the number of times of split injection is large, an interval between injection into one cylinder and injection into another cylinder becomes shorter. This upsets the charge/discharge balance of the boosted voltage 210 and may lead to a case where fuel injection is started as the boosted voltage 210 remains low. The same thing happens when supply of the boosted voltage 210 becomes impossible due to a failure of the high-voltage generating unit 206 or the like. When the high-voltage generating unit 206 fails, the battery voltage 209 is supplied, in which case increasing the drive current takes much time.

Figure 11:
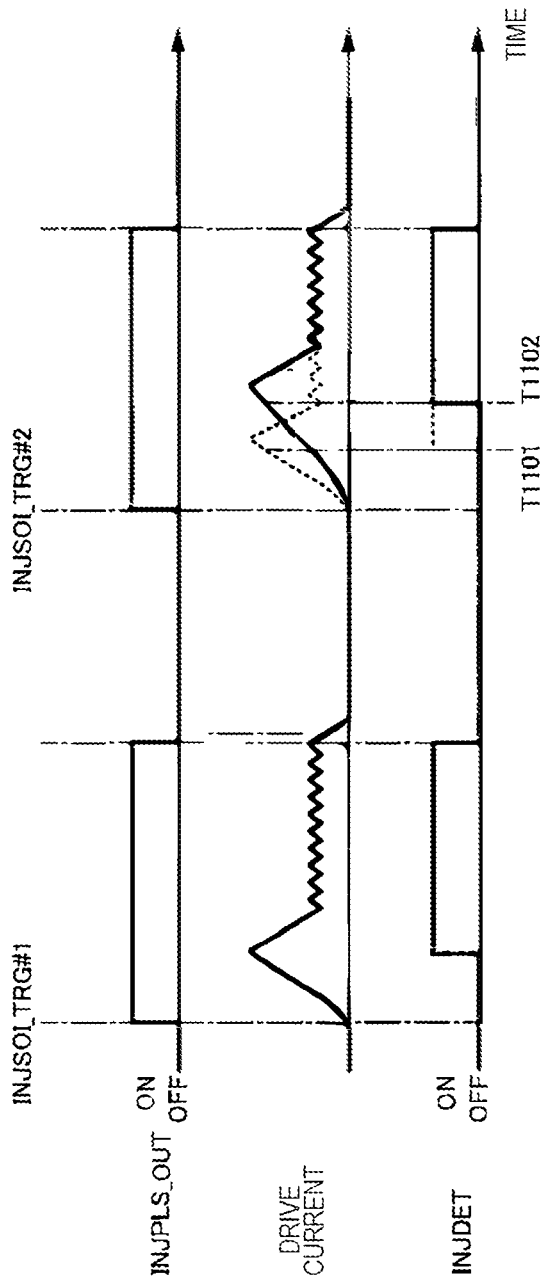
FIG. 11 is a timing chart for explaining a case where split injection abnormality determination is not executed, depending on a boosted voltage according to the one embodiment of the present invention.

FIG. 11 is a timing chart for explaining a case where split injection abnormality determination is not executed, depending on the boosted voltage 210. Broken lines represent waveforms that result when the boosted voltage 210 is high, and solid lines represent waveforms that result when the boosted voltage 210 is low.

When an injection pulse is outputted at the injection start timing INJSOI_TRG, a voltage is applied to the fuel injection valve 105, where a drive current starts to flow. However, because the boosted voltage 210 is low, the drive current is slow to rise and therefore the drive current value is slow to reach the signal-on threshold. For example, when the boosted voltage 210 is high, the drive current value reaches the signal-on threshold at a timing T1101. When the boosted voltage is low, however, it reaches the signal-on threshold at a timing T1102 later than the timing T1101. As a result, a timing at which the drive current detection signal INJDET switches on does not stay within the given range 703 from the injection start timing INJSOI_TRG #2, in which case an abnormality of the split injection function is determined.

For this reason, when a voltage (boosted voltage 210) applied to the fuel injection valve 105 is equal to or lower than a given value or when the boosted device is determined to be in an abnormal state, determination on an abnormality of the split injection function is not carried out.

As described above, in the fuel injection control device (fuel injection control device 127) according to this embodiment, the injection abnormality detection execution determining unit (injection abnormality detection execution determining unit 212) does not permit execution of the injection abnormality detection by the injection abnormality detection unit (split injection abnormality detection unit 213) when a voltage applied to the fuel injection valve is equal to or lower than a given value.

Besides, the temperature of cooling water is one of pieces of information indicating an engine state. When the temperature of cooling water measured by the water temperature sensor 108 is high, the temperature of the internal combustion engine 101 is high and the resistance value of the drive circuit is small, which raises a possibility of a drop in the boosted voltage 210. It is therefore desirable that when the temperature of cooling water is higher than a threshold, determination on an abnormality of the split injection function be not carried out.

As described above, in this embodiment, the injection abnormality detection execution determining unit (injection abnormality detection execution determining unit 212) does not permit execution of the injection abnormality detection by the injection abnormality detection unit (split injection abnormality detection unit 213) when a measurement by the water temperature sensor 108, which measures the temperature of cooling water of the internal combustion engine, is equal to or higher than a threshold.

(Split Injection Abnormality Determination that is Executed Depending on Forced End Timing)

Split injection abnormality determination that is executed depending on a forced end timing of fuel injection will then be described with reference to FIGS. 12 and 13.

When the injection start timing INJSOI_TRG is set as a timing preceding a valve closing completion timing of the exhaust valve 104, the fuel injected from the fuel injection valve 105 is discharged to the exhaust pipe 111 without being combusted. This leads to the deterioration of discharge performance. When a timing at which an injection pulse switches off is close to an ignition timing, a sufficient vaporization time of the injected fuel is not ensured, in which case formation of the fuel-air mixture ends up in insufficient. In such a case, the fuel may deposit on the ignition plug 106. For this reason, with a fuel vaporization time being taken into consideration, an injection operation is usually completed within a time span between the ignition timing and a point of time (forced end timing T1201) set by shifting an end timing by a given period toward the advance side.

However, in a transient state resulting from an increase in the number of times of split injection, injection interval adjustment, or a sharp change in the engine rotating speed, which are mentioned above, the fuel injection end timing is delayed. This results in a case where the injection pulse signal remains in the on-state after the forced end timing T1201 or where the injection start timing INJSOI_TRG arrives after the forced end timing T1201. In such cases, the injection pulse is switched off at the forced end timing T1201. This raises a possibility that fuel injection is not executed despite a fuel injection request being made by the split injection control instruction unit 201, and in such a case, the drive current detection signal INJDET does not switches on.

Figure 12:
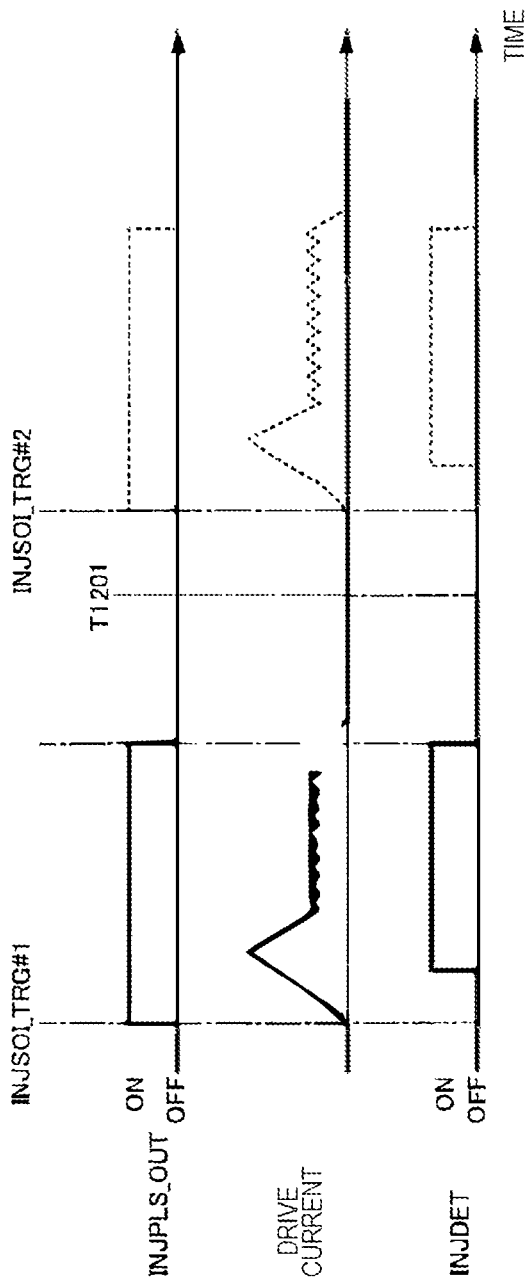
FIG. 12 is a timing chart (1) for explaining a case where split injection abnormality determination is not executed, depending on a forced end timing according to the one embodiment of the present invention.

FIG. 12 is a timing chart (1) for explaining a case where split injection abnormality determination is not executed, depending on a forced end timing. Broken lines represent waveforms that are supposed to be outputted. In FIG. 12, the second injection start timing INJSOI_TRG #2 arrives after the forced end timing T1201. As a result, the injection pulse INJPLS_OUT is not outputted from the fuel injection pulse signal calculating unit 202 and therefore the drive current detection signal INJDET does not switch on.

Figure 13:
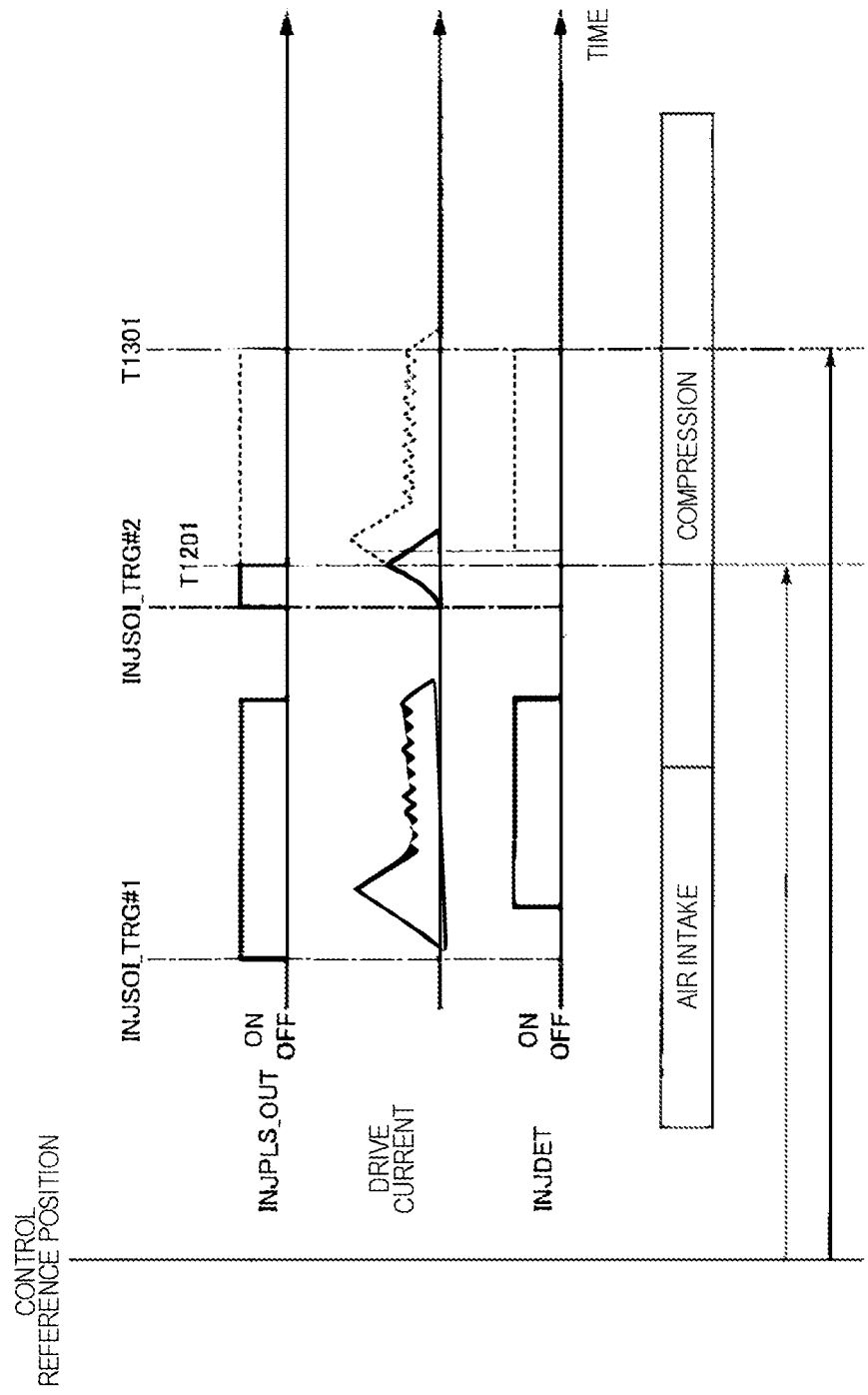
FIG. 13 is a timing chart (2) for explaining a case where split injection abnormality determination is not executed, depending on a forced end timing according to the one embodiment of the present invention.

FIG. 13 is a timing chart (2) for explaining a case where split injection abnormality determination is not executed, depending on a forced end timing. Broken lines represent waveforms that are supposed to be outputted, and solid lines represent waveforms that are actually outputted. In FIG. 13, an injection end timing (T1301) of the injection pulse INJPLS_OUT, which has been outputted at the second injection start timing INJSOI_TRG #2, arrives after the forced end timing T1201. As a result, the injection pulse INJPLS_OUT switches off at the forced end timing T1201 and therefore the drive current detection signal INJDET does not switch on.

For this reason, when the forced end timing T1201 arrives in a period in which the injection pulse is on or before the injection start timing INJSOI_TRG, determination on an abnormality of the split injection function is not carried out.

As described above, the injection abnormality detection execution determining unit (split injection abnormality detection execution determining unit 212) does not permit execution of the injection abnormality detection by the injection abnormality detection unit (split injection abnormality detection unit 213) when at least either a crank angle at a target output timing (injection start timing INJSOI_TRG) of an injection pulse signal or a crank angle at a target stop timing of the same is equal to or larger than a given rotation angle from a control reference position of the internal combustion engine. The crank angle being the given rotation angle refers to a timing at which the crankshaft 131 has rotated from the control reference position by the given angle, and this timing is equivalent to the forced end timing T1201.

(Split Injection Abnormality Determination During Fuel Cut)

Split injection abnormality determination executed during fuel cut will then be described.

A fuel cut process is executed when a vehicle equipped with the internal combustion engine decelerates or a component related to fuel injection fails. Usually, pieces of information necessary for fuel cut are collected, and a fuel cut instruction is outputted from a control instruction unit (not illustrated) different from the split injection control instruction unit 201 to the fuel injection pulse signal calculating unit 202 to stop fuel injection. Another method may also be adopted, according to which a fuel cut request is outputted to the split injection control instruction unit 201, which sets a required injection amount to zero. Specifically, when a period during which the injection pulse INJPLS_OUT remains on is zero, the drive current detection signal INJDET does not switch on. In this case, therefore, determination on an abnormality of the split injection function is not carried out.

As described above, the injection abnormality detection execution determining unit (split injection abnormality detection execution determining unit 212) does not permit execution of the injection abnormality detection by the injection abnormality detection unit (split injection abnormality detection unit 213) when an instruction to stop energizing the fuel injection valve is issued.

According to the above configuration, however, making an erroneous abnormality determination can be avoided in these abnormal states: "a timing of fuel injection is shifted relative to an instruction value" and "fuel injection is not executed" but detecting the abnormal state "fuel injection is executed despite no instruction value being present" becomes impossible.

To prevent this, abnormality determination during fuel cut is executed not by comparing the injection start timing INJSOI_TRG with the timing at which the drive current detection signal INJDET switches on but by determining whether the drive current detection signal INJDET switches on during fuel cut. This allows accurate abnormality determination of determining whether the abnormal state "fuel injection is executed despite no instruction value being present" has occurred.

As described above, when an instruction to stop energizing the fuel injection valve is issued, the injection abnormality detection unit (split injection abnormality detection unit 213) determines that the fuel injection valve has an injection abnormality when a drive current detection signal (drive current detection signal INJDET) to the fuel injection valve, the drive current detection signal being outputted from the drive state detection unit (fuel injection valve drive state detection unit 211), switches on during stoppage of energization of the fuel injection valve.

As described above, the fuel injection control device (fuel injection control device 127) according to this embodiment is the fuel injection control device that controls the plurality of fuel injection valves (105) each having the coil for energization. The fuel injection control device includes: the fuel injection pulse output unit (fuel injection pulse signal calculating unit 202) that outputs an injection pulse signal for driving the fuel injection valve, based on a fuel injection instruction; the drive state detection unit (fuel injection valve drive state detection unit 211) that detects a drive state of the fuel injection valve, from an energization current or an applied voltage of the coil of the fuel injection valve; the injection abnormality detection unit (split injection abnormality detection unit 213) that detects an injection abnormality of the fuel injection valve by comparing the fuel injection instruction with the drive state of the fuel injection valve; and the injection abnormality detection execution determining unit (split injection abnormality detection execution determining unit 212) that based on a state of the internal combustion engine, determines whether or not to permit execution of injection abnormality detection by the injection abnormality detection unit, and that when determining not permitting execution of the injection abnormality detection, prevents the injection abnormality detection unit from executing the injection abnormality detection.

According to the fuel injection control device of this embodiment, the fuel injection control device having the above configuration, in abnormality determination of determining whether fuel injection by the fuel injection valve has been executed normally, the fuel injection control device detects a case where the injection function (e.g., the split injection function) may possibly be determined to be in an abnormal state despite the injection function's being in a normal state, based on a state of the internal combustion engine, and carries out control for avoiding erroneous abnormality determination. As a result, in determination on an abnormality of the injection function, making an erroneous determination is prevented. Hence an abnormality of the injection function can be detected accurately, which prevents the deterioration of exhaust performance, torque fluctuations at the internal combustion engine, and the like that are caused by an erroneous abnormality determination (or an erroneous normal determination).

In the fuel injection control device (fuel injection control device 127) according to this embodiment, a state of the internal combustion engine (internal combustion engine 101) refers to a drive state of the fuel injection valve (fuel injection valve 105), and indicates at least the interval (injection interval 901) between consecutively outputted injection pulse signals or the width of the injection pulse signal or the voltage (boosted voltage 210) applied to the coil (solenoid 407) or the rising timing (injection start timing INJSOI_TRG) of the injection pulse signal or the falling timing of the injection pulse signal.

In the fuel injection control device (fuel injection control device 127) according to this embodiment, a state of the internal combustion engine (internal combustion engine 101) refers to at least the rotating speed of the internal combustion engine or the temperature of the internal combustion engine.

<Modification>

The one embodiment of the fuel injection control device of the present invention, together with effects the fuel injection control device offer, has been described above.

However, the present invention is not limited to the one embodiment described above. Obvious to say, the present invention may be embodied in various applications and modifications other than the one embodiment, proving that such applications and modifications do not depart from the substance of the present invention that is described in the claims.

For example, in the above one embodiment, the configuration of the fuel injection control device has been described specifically in detail to facilitate understanding of the present invention, and the configuration is not limited to one that includes all constituent elements described above. In addition, some of constituent elements of the one embodiment can be deleted or replaced with other constituent elements or other constituent elements may be added to constituent elements of the one embodiment.

Some or all of the above-described constituent elements, functions, processing units, and the like may be provided in the form of hardware, such as properly designed integrated circuits. A field programmable gate array (FPGA)), an application specific integrated circuit (ASIC), and the like may be used as such hardware.

REFERENCE SIGNS LIST 101 internal combustion engine
105 fuel injection valve
109 ECU
127 fuel injection control device
201 split injection control instruction unit
202 fuel injection pulse signal calculating unit
203 fuel injection drive waveform instruction unit
211 fuel injection valve drive state detection unit
212 split injection abnormality detection execution determining unit
213 split injection abnormality detection unit
214 engine state detection unit
407 solenoid

The invention claimed is:

1. A fuel injection control device that controls a plurality of fuel injection valves each having a coil for energization, the fuel injection control device comprising:
a fuel injection pulse output unit that outputs an injection pulse signal for driving a fuel injection valve, based on a fuel injection instruction;
a drive state detection unit that detects a drive state of the fuel injection valve, from an energization current or an applied voltage of the coil of the fuel injection valve;
an injection abnormality detection unit that detects an injection abnormality of the fuel injection valve by comparing the fuel injection instruction with the drive state of the fuel injection valve; and
an injection abnormality detection execution determining unit that based on a state of an internal combustion engine, determines whether or not to permit execution of injection abnormality detection by the injection abnormality detection unit, and that when determining not permitting execution of the injection abnormality detection, prevents the injection abnormality detection unit from executing the injection abnormality detection, wherein
a state of the internal combustion engine refers to a drive state of the fuel injection valve, and indicates at least an interval between consecutively outputted injection pulse signals or a width of an injection pulse signal or a voltage applied to the coil or a rising timing of the injection pulse signal or a falling timing of the injection pulse signal, and
the injection abnormality detection execution determining unit does not permit execution of injection abnormality detection by the injection abnormality detection unit when at least either a crank angle at a target output timing of the injection pulse signal or a crank angle at a target stop timing of the injection pulse signal is equal to or larger than a given rotation angle from a control reference position of the internal combustion engine.

2. The fuel injection control device according to claim 1, wherein a state of the internal combustion engine refers to at least a rotating speed of the internal combustion engine or a temperature of the internal combustion engine.

3. The fuel injection control device according to claim 2, wherein the injection abnormality detection execution determining unit does not permit execution of injection abnormality detection by the injection abnormality detection unit when a rotating speed of the internal combustion engine is equal to or higher than a given value.

4. The fuel injection control device according to claim 2, wherein the injection abnormality detection execution determining unit does not permit execution of injection abnormality detection by the injection abnormality detection unit when a measurement by a water temperature sensor that measures a temperature of cooling water of the internal combustion engine is equal to or higher than a given value.

5. The fuel injection control device according to claim 1, wherein the injection abnormality detection execution determining unit does not permit execution of injection abnormality detection by the injection abnormality detection unit when an interval between a target stop timing of an injection pulse signal in a previous round of injection and a target output timing of an injection pulse signal in a current round of injection is shorter than a given value.

6. The fuel injection control device according to claim 1, wherein the injection abnormality detection execution determining unit does not permit execution of injection abnormality detection by the injection abnormality detection unit when a width of an injection pulse signal, the width being specified by an energization time instruction to the fuel injection valve, is shorter than a given value.

7. The fuel injection control device according to claim 1, wherein the injection abnormality detection execution determining unit does not permit execution of injection abnormality detection by the injection abnormality detection unit when a voltage applied to the fuel injection valve is equal to or lower than a given value.

8. The fuel injection control device according to claim 1, wherein the injection abnormality detection execution determining unit does not permit execution of injection abnormality detection by the injection abnormality detection unit when an instruction to stop energizing the fuel injection valve is issued.

9. The fuel injection control device according to claim 1, wherein when an instruction to stop energizing the fuel injection valve is issued, the injection abnormality detection unit determines that the fuel injection valve has an injection abnormality when a drive current detection signal to the fuel injection valve, the drive current detection signal being outputted from the drive state detection unit, switches on during stoppage of energization of the fuel injection valve.

10. The fuel injection control device according to claim 1, wherein the injection abnormality detection unit compares a target output timing of an injection pulse signal, the target output timing being specified by the fuel injection instruction, with a rising timing of a drive current detection signal of the fuel injection valve, the drive current detection signal being outputted from the drive state detection unit, and detects an injection abnormality of the fuel injection valve, based on a difference between both timings.

* * * * *